United States Patent
Lam et al.

(10) Patent No.: US 8,525,979 B2
(45) Date of Patent: Sep. 3, 2013

(54) MONITORING DEVICE FOR DETECTING STRESS STRAIN AND METHOD FOR USING SAME

(76) Inventors: Duhane Lam, Vancouver (CA); Mark William Ellens, Richmond (CA)

(*) Notice: Subject to any disclaimer, the term of this patent is extended or adjusted under 35 U.S.C. 154(b) by 686 days.

(21) Appl. No.: 12/481,571

(22) Filed: Jun. 10, 2009

(65) Prior Publication Data

US 2009/0310120 A1  Dec. 17, 2009

Related U.S. Application Data

(60) Provisional application No. 61/061,958, filed on Jun. 16, 2008.

(51) Int. Cl.
  *G01B 11/16* (2006.01)
(52) U.S. Cl.
  USPC .............................................. 356/35; 356/32
(58) Field of Classification Search
  USPC ............................... 356/32, 33, 34, 35
  See application file for complete search history.

(56) References Cited

U.S. PATENT DOCUMENTS

| | | | | |
|---|---|---|---|---|
| 2,920,480 A | * | 1/1960 | Haas | 73/787 |
| 3,136,154 A | * | 6/1964 | Christensen | 73/787 |
| 3,178,934 A | * | 4/1965 | O'Regan | 356/34 |
| 3,216,312 A | * | 11/1965 | Oppel | 359/489.19 |
| 3,313,204 A | * | 4/1967 | Oppel | 356/34 |
| 3,774,443 A | * | 11/1973 | Green et al. | 73/577 |
| 3,994,598 A | * | 11/1976 | Reytblatt | 356/34 |
| 4,008,960 A | * | 2/1977 | Reytblatt | 356/33 |
| 4,075,011 A | * | 2/1978 | Iwasa et al. | 430/54 |
| 4,112,746 A | * | 9/1978 | Itoh et al. | 73/789 |
| 4,123,158 A | | 10/1978 | Reytblatt | |
| 4,164,874 A | * | 8/1979 | Cassatt et al. | 73/799 |
| 4,252,440 A | * | 2/1981 | Frosch et al. | 356/216 |
| 4,498,348 A | | 2/1985 | Wesson | |
| 4,590,804 A | * | 5/1986 | Brull | 73/762 |
| 4,639,997 A | * | 2/1987 | Brull | 29/407.01 |
| 4,777,358 A | * | 10/1988 | Nelson | 250/225 |
| 4,830,540 A | * | 5/1989 | Abrams | 405/216 |
| 5,018,389 A | | 5/1991 | Mraz | |
| 5,227,731 A | * | 7/1993 | Prabhakaran et al. | 324/718 |
| 5,237,875 A | * | 8/1993 | de la Veaux | 73/775 |
| 5,242,722 A | * | 9/1993 | Hiraka et al. | 428/34.6 |
| 5,400,131 A | * | 3/1995 | Stockley et al. | 356/33 |

(Continued)

OTHER PUBLICATIONS

Vishay Micro-Measurements, "PhotoStress Coating Materials and Adhesives", Document No. 11222, Revision Apr. 14, 2004, Vishay Micro-Measurements, www.vishaymg.com.

(Continued)

*Primary Examiner* — Roy M Punnoose

(57) ABSTRACT

The present invention provides a monitoring device for detecting stresses and strains in structural components and a method of using the monitoring device. The monitoring device comprises a base material, one or more attachment points for attaching the monitoring device to a structure to be monitored, a detection zone on the monitoring device, and a means for detecting the presence of stress and strain in the detection zone. The dimensions and material of the monitoring device are chosen such that a predetermined level of strain transmitted to the monitoring device from the structure will result in a known level of stress and strain in the detection zone. Detection of stress and strain in the detection zone can be correlated to a level of stress and strain experienced by the structure at the point of attachment of the monitoring device.

12 Claims, 12 Drawing Sheets

(56) References Cited

U.S. PATENT DOCUMENTS

| | | | |
|---|---|---|---|
| 5,421,204 A | | 6/1995 | Svaty, Jr. |
| 5,425,274 A * | | 6/1995 | Creager ............... 73/762 |
| 5,507,188 A | | 4/1996 | Svaty, Jr. |
| 5,528,151 A * | | 6/1996 | Perez ............... 324/525 |
| 5,531,123 A * | | 7/1996 | Henkel ............... 73/795 |
| 5,534,289 A | | 7/1996 | Bilder et al. |
| 5,568,259 A * | | 10/1996 | Kamegawa ............... 356/625 |
| 5,591,965 A | | 1/1997 | Udd |
| 5,699,159 A | | 12/1997 | Mason |
| 5,789,680 A * | | 8/1998 | Fujimoto ............... 73/799 |
| 5,818,982 A | | 10/1998 | Voss et al. |
| 5,848,204 A | | 12/1998 | Wanser |
| 6,094,259 A * | | 7/2000 | Kamegawa ............... 356/32 |
| 6,215,927 B1 | | 4/2001 | Singh |
| 6,219,139 B1 * | | 4/2001 | Lesniak ............... 356/366 |
| 6,327,030 B1 * | | 12/2001 | Ifju et al. ............... 356/32 |
| 6,460,418 B1 * | | 10/2002 | Hiyoshi ............... 73/800 |
| 6,578,430 B1 * | | 6/2003 | Duerr ............... 73/787 |
| 6,588,282 B2 | | 7/2003 | Arms |
| 6,635,910 B1 * | | 10/2003 | Gross ............... 257/254 |
| 6,650,405 B2 * | | 11/2003 | Lam et al. ............... 356/33 |
| 6,701,260 B1 | | 3/2004 | Rouvari |
| 6,703,600 B1 | | 3/2004 | Hodge |
| 6,816,638 B1 | | 11/2004 | Bennian et al. |
| 6,913,079 B2 | | 7/2005 | Tebel |
| 6,928,881 B2 | | 8/2005 | Brennan |
| 6,943,869 B2 * | | 9/2005 | Hubner et al. ............... 356/34 |
| 6,983,660 B2 * | | 1/2006 | Kwon ............... 73/806 |
| 6,985,214 B2 * | | 1/2006 | Szaroletta et al. ............... 356/34 |
| 7,230,421 B2 * | | 6/2007 | Goldfine et al. ............... 324/240 |
| 7,323,678 B2 | | 1/2008 | Abrate et al. |
| 7,377,181 B2 * | | 5/2008 | Christ et al. ............... 73/800 |
| 7,434,480 B2 | | 10/2008 | Georgeson et al. |
| 7,509,872 B2 * | | 3/2009 | Hyodo et al. ............... 73/800 |
| 7,571,058 B2 | | 8/2009 | Sealing et al. |
| 2002/0001073 A1 * | | 1/2002 | Lam et al. ............... 356/33 |
| 2004/0066503 A1 * | | 4/2004 | Hubner et al. ............... 356/34 |
| 2006/0007424 A1 * | | 1/2006 | Hubner et al. ............... 356/34 |
| 2006/0192177 A1 | | 8/2006 | Chen et al. |
| 2008/0061959 A1 | | 3/2008 | Breed |
| 2008/0094609 A1 * | | 4/2008 | Ragucci et al. ............... 356/34 |

OTHER PUBLICATIONS

Agrawal, R.B., and L.W. Teufel, "Epon 828 Epoxy: A New Photoelastic Model Material" Experimental Mechanics, vol. 23, No. 1, Mar. 1983, pp. 30-35.

Mita, Akira, and Sinpei Takahira, "Peak Strain and Displacement Sensors for Structural Health Monitoring", 3rd International workshop onStructural Health Monitoring, Stanford University, Sep. 12-14, 2001, pp. 1-8.

Dulieu-Barton, J.M., "Full-field Experimental Stress/Strain Analysis of Sandwich Structures", Book Sect.—Advanced School of Sandwich Structures 2008 (Lectures), May 2008, 14 pgs. In total, ID code: 51207.

Calvert, G., J. Lesniak, and M. Honlet, "Applications of Modern Automated Photoelasticity to Industrial Problems", Insight, vol. 44, No. 4, Apr. 2002, pp. 1-4.

* cited by examiner

MONITORING DEVICE FOR DETECTING STRESS STRAIN AND METHOD FOR USING SAME

CROSS-REFERENCE TO RELATED APPLICATIONS

This application is entitled to the benefit of the filing date of U.S. Provisional Patent Application No. 61/061,958 filed Jun. 16, 2008.

TECHNICAL FIELD

This invention relates to the field of stress and strain detection and structural monitoring, and in particular to a monitoring device and a method for stress and strain detection and structural monitoring.

BACKGROUND ART

Stress and Strain Measurement

Strain, e, is a dimensionless response to stress expressed as a fraction $e=\Delta L/L_o$ where $L_o$ is the original length of the object and $\Delta L$ is the change in length of the object when stress is applied. Stress, s, is a measure of force per unit area given by F/A where F is the force being applied and A is the area it is being applied to. Because stress cannot be measured directly in practice, strain is measured instead. The stress in an object is related to the strain by the Young's Modulus, E, which is given by the following relationship:

$$E = s/e_{el} = \frac{(F/A)}{(\Delta L/L_o)} = \text{stress/strain.}$$

Knowing the Elastic Modulus of a given material, the stress in the material can be determined by measuring the strain. Traditionally, stress and strain measurements have been accomplished by a number of different methods. Some of these methods are described below:

Strain Gages

Strain gages are small electronic devices that measure strain through a change in resistance. The resistance, R, of a wire is a function of the size of the wire as well as of the material as follows:

$$R = \rho\left(\frac{L}{A}\right),$$

where L is the length of the wire, A is the cross-sectional area of the wire, and ρ is electrical resistivity, a property of the material. As the length of the wire L increases and the cross-sectional area A decreases, the resistance R increases. This property can be exploited to measure strain with a strain gage. By measuring the increase in resistance of a length of a thin wire attached to a part, the strain in the part can be determined and the stress calculated.

Fiber Optics

Fiber-optics can be used to measure stress and strain by detecting the change in length of an optical fiber. In theory, the operation of a fiber-optic strain gage is similar to the operation of a strain gage that measures change in resistance. In the case of a fiber-optic strain gage, a change in the transmissibility of light is being measured. Fiber-optic strain gages possess the same disadvantages as standard strain gages: they are difficult to apply and require external circuitry or instruments to interpret the signal.

Because of the disadvantages and the complexity of strain gages, brittle lacquer, and fiber-optics, these techniques for measuring stress and strain are typically used only at the product development stage for high-value products such as aircraft parts. Production parts and structures such as bridges and buildings generally do not come with built-in strain gages for monitoring stresses and strains, although this might be desirable in some cases. For example, monitoring the stresses and strains in a bridge or overpass could be useful for ensuring the safety of that structure. However, the cost of existing monitoring methods is prohibitive for widespread deployment into many production applications and civil engineering structures. Existing techniques of detecting stress and strain are expensive enough to make them somewhat prohibitive even on prototypes at the product development stage.

Brittle Coatings

Brittle lacquer is a brittle coating that cracks easily under tensile strain. The lacquer is applied to the unstressed part. When the part is stressed, the brittle lacquer cracks, starting at the areas of highest strain. Brittle lacquer is difficult to work with and does not provide a quantitative measure of the stress and strain. As such, the brittle lacquer method can only indicate which areas of a part are experiencing stress and strain. Also, only one test is possible with a given application of brittle lacquer. Once the brittle lacquer has cracked, the coating must be stripped off and reapplied for subsequent tests. One supplier of brittle lacquer coatings is StressCoat Inc. of Upland, Calif.

A similar type of coating that cracks under strain and can thus be used to detect strain is disclosed by Ifju et al (U.S. Pat. No. 6,327,030). Ifju's coating is luminescent and changes in strain cause cracks that can be seen because of the different properties in how the coating luminesces. The problem with this type of coating as with all brittle coatings is they are difficult to apply and use. The coating is only good for one test, and are typically not suitable for use in production parts and structural monitoring applications where environmental and corrosion protection are required.

Photoelastic Techniques

Photoelastic techniques are optical techniques for detecting stress and strain that make use of the photoelastic properties of certain materials. The speed of propagation of light in transparent materials is generally slower than in a vacuum or in air. The ratio of the speed of light in a given material to the speed of light in a vacuum is called the index of refraction of that material. In homogeneous materials, the index of refraction is constant regardless of the direction of propagation or plane of vibration of the light. In other materials, strain in the material causes the index of refraction to change depending on the direction of propagation of light. These materials, which can be optically isotropic when unstrained, become optically anisotropic when strain is present.

Materials that become optically anisotropic when stressed are known as photoelastic materials. The change in index of refraction relative to index axis in the material can typically be related to the stress and strain in the material by observing and quantifying the photoelastic effect. The photoelastic effect is caused by alternately constructive and destructive interference between light rays that have undergone relative retardation, or phase shift, in the stressed photoelastic material. When illuminated with polarized light and viewed through a polarizing filter, fringe patterns become visible in the photoelastic material that reveal the overall stress and strain distribution in the part and show the locations and magnitudes of the stresses and strains in the part. A person skilled in the art of photoelastic analysis can interpret and measure these patterns.

Photoelastic Coatings

Photoelastic coatings have traditionally only been used for laboratory testing or prototype testing because of the cost of the coatings, the difficulty of applying the coatings, and the unsuitability of the coatings for production components or for applying to structures in the field. Photoelastic coatings are available from companies such as Measurements Group (http://www.vishay.com/company/brands/measurements-group/) in sheet form, and also in a liquid plastic form that is cast onto prototype parts and then bonded on using adhesive. Both these types of coatings are cost and labour-intensive to apply, and are not well suited for complex parts, large parts, or parts made in higher quantities.

Lam and Ellens disclose a method for applying a photoelastic coating using powder coating techniques (U.S. Pat. No. 6,650,405) that is low cost, easy to apply, and can be applied on parts with complex three-dimensional shapes. The application of a photoelastic coating using powder coating methods is much less expensive than applying of traditional photoelastic coatings. The low cost makes a powder coated photoelastic layer more suitable for application to parts that are made in higher quantities for field use. Once powder coated with the photoelastic layer, the parts and structures can then be inspected in service using photoelastic techniques to determine if any strain is present in the part or if any plastic deformation has occurred. This is a useful and low cost method of monitoring parts and can increase public safety by helping with early detection of failures before they become catastrophic.

However, the method of applying a photoelastic coating techniques as disclosed by Lam and Ellens in U.S. Pat. No. 6,650,405 suffers from a number of limitations, for example in its applicability to structural monitoring of larger structures in the field such as bridges, buildings, and larger aerospace components. One limitation is that powder coating is applied as a dry finely-divided solid powder and typically needs to be baked on by increasing the temperature of the powder and the part being coated to an elevated level (typically from 100° C. to 200° C.). This can be impractical or inconvenient for large parts such as bridge trusses and large beams because these parts may not fit into an oven, and also because the energy required to heat these parts up to the temperature required could be prohibitive. It may also not be practical to apply powder coating to some structures already in use, particularly if they are installed on a permanent basis in the field. Finally, some structural parts and components are made out of materials that cannot be heated to the elevated temperatures required for curing powder. For example, some types of alloys are subjected to heat treatments that can be affected if the part is subsequently heated to an elevated temperature. Applying a photoelastic layer to these parts using powder coating may not be practical or possible.

Non Destructive Testing

Non-Destructive Testing (NDT) methods are used to inspect structures to determine if they are structurally sound, or if failure is imminent. However, existing NDT techniques are typically expensive to apply and cannot detect certain types of failure such as plastic deformation and simple overloading that does not result in cracks. Existing NDT techniques include liquid penetrant tests, eddy-current tests, and X-Ray testing. NDT techniques described can typically detect voids or cracks, but cannot typically detect whether a structural component has been subjected to a stress that is too high, or whether it has experienced any plastic deformation.

Structural Monitoring

Structures such as buildings, bridges, airplanes, and other critical structures are prone to failure. Failure can happen with significant loss of life and property, as evidenced by the recent collapse of the I-35 bridge in Minnesota. As such, structural monitoring is becoming an even more important field and can have a significant positive impact on public health and safety.

Prior art approaches to structural monitoring typically involve expensive monitoring devices and expensive monitoring systems. A prior art system that involves the use of a linear transducer is disclosed by Arms (U.S. Pat. No. 6,588,282). The transducer has two components that move relative to one another, and a clamping mechanism is used to prevent the shortening of the relative strain between the two components. This system has disadvantages because of the moving parts involved, and the precise orientation required for those moving parts to work. Also, the system requires an electronic system to detect the signal. These factors combine to make this system expensive and less suitable for large-scale deployment for structural monitoring.

Another prior-art approach to structural monitoring is disclosed by Brennen (U.S. Pat. No. 6,928,881). Brennen's approach involves the use of strain gauges mounted in a housing along with instrumentation that records and stores the stress levels experienced by the structure. While this approach can give an accurate time history of stresses experienced by a structure, it is prohibitively expensive because of the use of on-board monitoring and storage. The collection of all the historical stress data is excessive and unnecessary. The regular storage and retrieval of all the data is expensive and requires overly-frequent visits to perform downloads. Also, because data will only be recorded at a certain sampling rate, it is possible with Brennen's system to miss key events such as stress strain peaks. This could lead to false conclusions regarding the safety of the structure because key peak events have been missed. Increasing the sampling rate to try to capture these peak key events means more data needs to be stored. Reducing the sampling rate in order to reduce the amount of data stored only makes the problem of missing key events worse.

Bilder et al, (U.S. Pat. No. 5,534,289) discloses a method of structural crack detection that involves the use of microcapsules in a coating that will burst and change the colour of a second coating layer. The coatings also provide environmental protection for the structural part. This method however can only detect cracks, and the requirement of microcapsules containing coloured dyes makes the method difficult and expensive.

In summary, prior art stress and strain measurement and non-destructive testing techniques suffer from a number of problems. In particular, current solutions are too expensive, not adequate, or not capable of monitoring structural components such as bridges, buildings, and components such as aircraft landing gear in a low-cost manner that allows an inspector to determine whether the structure has experienced excessive stress strain levels or not.

Also, existing solutions for monitoring stress and strain in structural components are not well adapted for use in the field. Monitoring of stresses and strains in the field using existing instruments and methods typically requires constant monitoring and logging of data to capture the stress strain history of the structure and part. Current solutions are problematic and expensive and do not allow for periodic low-cost inspections of structural parts and components without requiring constant monitoring or monitoring equipment to be present at all times. There is need for a device that is relatively inexpensive to manufacture, easy to install, that allows for easy inspections of structures and parts in the field to determine information on the stress strain experienced by that part.

This background information is provided to reveal information believed by the applicant to be of possible relevance to the present invention. No admission is necessarily intended, nor should be construed, that any of the preceding information constitutes prior art against the present invention.

SUMMARY OF INVENTION

An object of the present invention is to provide a monitoring device for detecting stress and strain in structures and structural components. In accordance with an aspect of the present invention, there is provided a monitoring device comprising a base material, one or more attachment points for attaching the monitoring device to a structure to be monitored, a detection zone on the monitoring device, and a means for detecting the presence of stress and strain in the detection zone. The dimensions and material of the monitoring device are chosen such that a predetermined level of strain transmitted to the monitoring device from the structure will result in a known level of stress and strain in the detection zone. Detection of stress and strain in the detection zone can be correlated to a level of stress and strain experienced by the structure at the point of attachment of the monitoring device.

Another object of the present invention is to provide a monitoring device for detecting vibration and shock loads in structures and structural components. In accordance with an aspect of the present invention, there is provided a monitoring device comprising a base material, one or more attachment points for attaching the monitoring device to a structure to be monitored at one end of the monitoring device. The other end of the monitoring device is left unattached and free to move. The monitoring device comprises a detection zone and a means for detecting the presence of stress and strain in the detection zone. The dimensions and material of the monitoring device are chosen such that a predetermined level of vibration transmitted to the monitoring device from the structure will result in plastic deformation in the detection zone. Detection of plastic deformation in the detection zone can show that the vibration experienced by the structure being monitored has exceeded a certain predetermined level.

Another object of the present invention is to provide a method for detecting whether a structure has experienced a certain level of stress or strain or overload. In accordance with another aspect of the invention, there is provided a method for detecting stress and strain in a structure comprising the steps of providing a monitoring device for detecting stress or strain, the monitoring device having attachment points and a detection zone designed to exhibit a certain level of strain or to deform plastically when the monitoring device is subjected to a predetermined amount of strain through the attachment points, attaching the monitoring device to a structure to be monitored in such a way that stresses and strains from the structure are transmitted into the monitoring device, and inspecting the structure by observing or measuring the monitoring device to determine whether the detection zone of the monitoring device is experiencing a certain level of stress or has plastically deformed.

BRIEF DESCRIPTION OF DRAWINGS

Having thus generally described the nature of the invention, reference will now be made to the accompanying drawings, showing by way of illustration several embodiments thereof, and in which.

DESCRIPTION OF EMBODIMENTS

Figure 1:
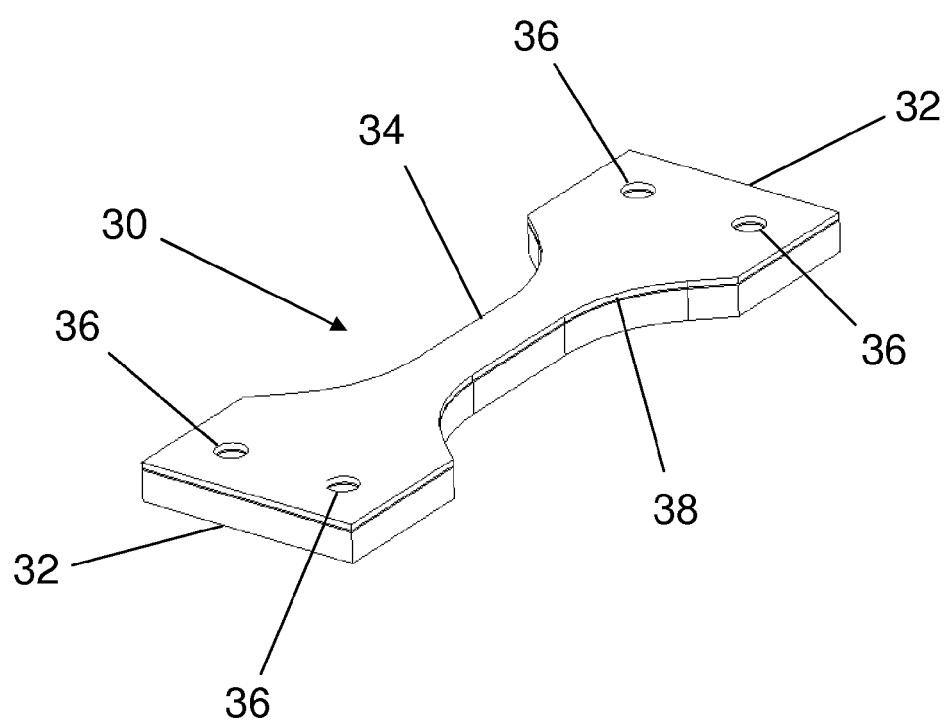
FIG. 1 is a general view of a monitoring device according to an embodiment of the present invention.

The following detailed description includes references to the accompanying drawings, which form a part of the detailed description. The drawings show, by way of illustration, specific embodiments in which the invention may be practiced. These embodiments, which are also referred to herein as "examples", are described in sufficient detail to enable those skilled in the art to practice the invention. The embodiments may be combined, other embodiments may be utilized, or structural, mechanical, and material composition changes may be made without departing from the scope of the present invention. The following detailed description is, therefore, not to be taken in a limiting sense, and the scope of the present invention is defined by the appended claims and their equivalents.

In accordance with the present invention, a new monitoring device and method for monitoring for stress and strain levels or plastic deformation in structural parts is described. The monitoring device can be made at relatively low cost, and enables quick and inexpensive inspections of many types of structures and parts. The monitoring device and method can detect whether the structural part has experienced a certain stress or strain level even when it is no longer experiencing that level of stress or strain. As such, the monitoring device does not need to be monitored constantly, greatly reducing the cost of structural monitoring. Even though the monitoring device does not need constant monitoring and does not require any electronic data storage, it can still capture peak stresses and strains that electronic monitoring systems with low sampling frequencies and electronic data storage might miss. The monitoring device can be attached to a structural part and inspected at regular or irregular intervals, or after a specific event such as an earthquake or if overloading is suspected. This can greatly facilitate the inspection of structures out in the field such as bridges and buildings and increase public safety as a result.

According to an aspect of the present invention, a monitoring device for detecting stress and strain is made for attaching to a structure or part to be monitored. The monitoring device is attached in such a way that stresses and strains in the structure or part are transmitted into the monitoring device. The monitoring device therefore undergoes stress and strain itself. Often, detecting stress and strain in the underlying structure directly can be difficult or impossible. The monitoring device includes some means for easily detecting stress and strain or deformation in the monitoring device itself. Detecting stress and strain or deformation in the monitoring device provides information regarding the stresses and strains experienced by the structure being monitored. For example, the monitoring device can be designed such that it will experience permanent deformation or some other irreversible failure when it is subjected to a pre-determined stress strain level. The pre-determined stress level can correspond to a certain stress strain level in the underlying part. Upon inspection, the presence of plastic deformation in the monitoring device indicates that the structure being monitored has experienced stress and strain in excess of that certain level.

Alternatively, the monitoring device can be designed such that the structure or part being monitored will plastically deform first in reaction to some load. Even if the monitoring device itself does not experience plastic deformation as a result of the stress strain transmitted to it at this level, the strain in the monitoring device resulting from the permanent plastic deformation in the underlying structure can be detected and measured. The device can be tuned for different stresses and strains by choosing the base material and dimensions of the device such that the stresses and strains transmitted into it result in predictable stress and strains within the monitoring device. The stresses and strains experienced by the monitoring device can be the same, lower, or higher than the stress and strain being transmitted into the device. The choice of base materials and design of the device will depend on the requirements of the application and the type of structural component the device is being attached to. The choice of base material and dimensions of the monitoring device can be made by one skilled in the art of stress strain analysis, using tools such as basic stress strain equations and finite element analysis.

Stress and strain in the monitoring device, including plastic deformation or failure, can be detected visually or through a variety of methods. If the monitoring device is made of photoelastic materials or coated with a photoelastic material, strain or plastic deformation in the monitoring device can be detected using photoelastic techniques. The monitoring device may have a polarizing filter built into it to facilitate photoelastic detection. It could also have built into it an electronic strain gauge, an optical strain gauge, or some other type of gauge that can be used to measure stress and strain. A monitoring device with a type of gauge such as a strain gauge or optical gauge would not need to be powered by electricity at all times. It can be powered only during inspections to determine if any strain is present or if permanent deformation has occurred. This saves on expense, complexity, and the requirement for any electronic monitoring or data-logging equipment.

Description of and Example of the Monitoring Device—FIG. 1

According to one aspect of the present invention, a new monitoring device for detecting stress and strain is described that can be used for structural monitoring and inspection purposes on bridges, building, and other structures as well as on structural components. FIG. 1 shows a monitoring device 30 for monitoring stress and strain levels in a structure or a part according to an embodiment of the present invention. In this example, monitoring device 30 has ends 32 and a detection zone 34. Attachment points 36 are shown as holes and can be used for attaching the monitoring device to a structure. A photoelastic layer 38 can be applied to monitoring device 30 according to the method of Lam and Ellens (U.S. Pat. No. 6,650,405) by using powder coating techniques to apply a reflective layer and then a photoelastic layer as a dry finely-divided solid that is fused together with heat to form a continuous coating. Alternatively, the photoelastic layer can be attached by bonding a photoelastic sheet to the monitoring device, or it can be applied as a solvent-based liquid or gel that cures through evaporation of the solvent. The base materials of monitoring device 30 can comprise of metallic materials such as aluminum or steel, or it can comprise of non-metallic materials such as plastic and composite materials. Other materials are also possible. Alternatively, the base material can comprise of translucent or transparent materials that exhibit photoelastic properties. In this case, photoelastic coating 38 may not be required.

In this example, the monitoring device is designed to detect when the structure it is attached to experiences a predetermined level of stress and strain. The monitoring device is designed such that it experiences yielding (plastic deformation) in the detection zone when that predetermined level of stress is experienced by the underlying structure. The monitoring device can be made from a material that has a lower yielding point. Therefore, assuming that stresses and strains are transmitted directly into the monitoring device from the underlying structure, the monitoring device can be made to plastically deform before the yield point is reached in the steel in the underlying structure. Detecting plastic deformation in the monitoring device indicates that the stress in the underlying structure has exceeded a certain pre-determined level. The plastic deformation can be detected in the monitoring device even if the underlying structure no longer has any load on it. Compared to prior-art methods of structural monitoring, this greatly facilitates inspections of the underlying structure for overloading and does not require any expensive electronic monitoring or data-logging equipment.

Alternatively, the monitoring device can be designed such that the underlying structure experiences plastic deformation before the base material of the monitoring device. For example, the monitoring device can be made out of a material that can experience a lot of strain before plastically deforming, such as some polymers. In this case, permanent plastic deformation in the underlying structure can be detected by inspecting to detect for strain in the monitoring device. Because the plastic deformation in the underlying part is permanent, the monitoring device will still be exhibiting stress strain even if the underlying structure no longer has any load on it.

Monitoring device 30 in this example is shown as a planar monitoring device of constant thickness throughout. These dimensions can facilitate ease of device fabrication and ease of attachment of the monitoring device to a structure to be monitored if the structure has a planar surface to attach to. For example, monitoring device 30 can be cut out of sheet metal using laser jet, water jet, machining, stamping, or other methods. Monitoring device 30 can also be formed into other shapes. For example, it does not need to be constant thickness throughout. Ends 32 can be made be made thicker than detection zone 34 in order to make the ends stiffer and concentrate strain into the detection zone. For example, ends 32 can be made 3 mm thick, while zone of detection 34 can be made 1 mm thick. Monitoring device 30 also does not need to be planar. Many other dimensions and shapes are possible and can be chosen by a person skilled in the art to best suit the application and the stress strain levels to be monitored.

Figure 2:
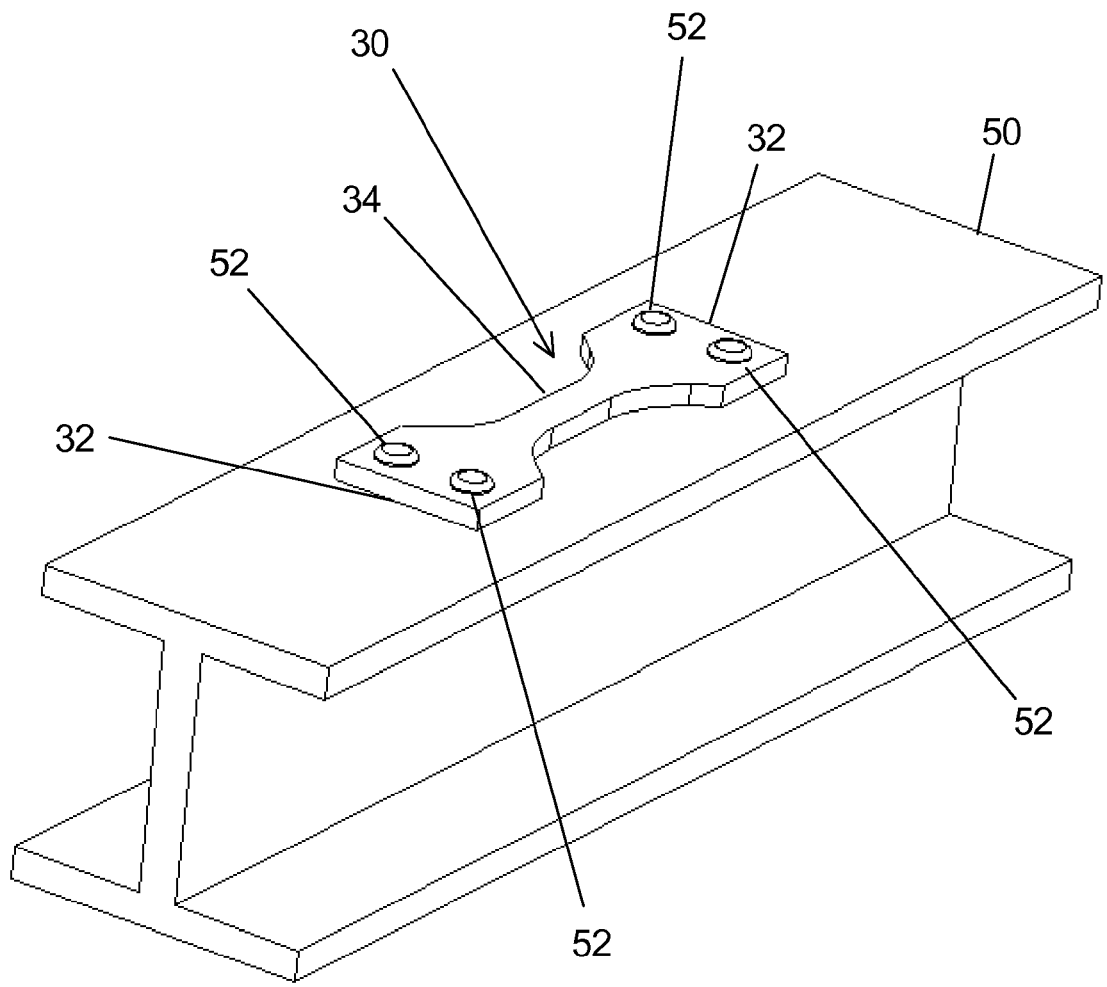
FIG. 2 is a general view of monitoring device for detecting stress and strain mounted on a structure, according to an embodiment of the present invention.

Description of a Structural Application Example—FIG. 2

FIG. 2 shows a monitoring device 30 according to an embodiment of the present invention attached to a structure 50. Monitoring device 30 is shown attached to structure 50 with rivets 52. Bolts, screws, or other such fasteners can be used in place of rivets 52 for attaching monitoring device 30 to structure 50. Alternatively monitoring device 30 can be attached to structure 50 via welding at ends 32, or by using adhesive. Other methods of attaching monitoring device 30 to structure 50 are also possible. In this example, detection zone 34 of monitoring device 30 sits on top of but is not attached to structure 50. Structure 50 is shown as an I-Beam in this example because an I-Beam is representative of many common structural applications. However, the structure may be of any shape and monitoring device 30 can be shaped to match the shape of structure 50. Structure 50 can comprise metallic materials such as steel and aluminum, or non-metallic materials such as plastics, concrete, and composite materials. When structure 50 experiences stress and strain, the strain is transmitted into monitoring device 30 via attachment points 36. Because detection zone 34 of the monitoring device is narrow and hence less stiff than ends 32, the strain will be concentrated in this area. The stress and strain in detection zone 34 of monitoring device 30 can be predicted based on the material properties and the geometry of the monitoring device by a person skilled in the art. For example, the stress and strain can be predicted by using standard stress and strain formulas or by computer modeling (e.g., with finite element analysis programs). Knowing the material properties of the base material in monitoring device 30, detection zone 34 can be designed to plastically deform or fail for a predetermined amount of strain being transmitted into it by structure 50 through its attachment points. This predetermined level of strain causing plastic deformation in the monitoring device corresponds to a certain amount of stress and strain in underlying structure 50, and presence of plastic deformation in monitoring device 30 indicates that structure 50 has experienced stresses and strains in excess of this certain amount.

By way of illustration, suppose underlying structure 50 is made of a steel material, with an ultimate tensile strength of 848 MPa (123,000 psi) and a yield strength of 648 MPa (94,000 psi). If the structure experiences a stress in excess of 848 MPa (123,000 psi), it will fail catastrophically. If the structure experiences a stress in excess of 648 MPa (94,000 psi) but less than 123,000 psi, it will yield (deform plastically) but it may not fail catastrophically. The deformation can be so subtle that it is invisible to the naked eye and even difficult to measure. However, once plastic deformation has occurred the structure has experienced an overload and corrective action should be taken. To monitor whether the structure as described above has experienced a stress in excess of its yield strength, the base material and geometry of a monitoring device 30 could be chosen such that when structure 50 experiences a stress and strain corresponding to 648 MPa (94,000 psi) or above, the strain transmitted into monitoring device 30 via attachment points 36 are sufficient to cause detection zone 34 to deform plastically also. Alternatively, the base material and geometry of the monitoring device could be chosen such that the structure it is attached to experiences plastic deformation before the monitoring device does. In this case, plastic deformation in the structure can be detected simply by detecting strains in the monitoring device when the structure is no longer under load. If the surface of the monitoring device is coated with a photoelastic coating, strain or plastic deformation in the monitoring device can be detected using photoelastic techniques by illuminating the monitoring device with polarized light and viewing the monitoring device through a polarizing filter. Fringe patterns can be observed in the photoelastic coating at the thin portion of the monitoring device if plastic deformation has occurred or if strain is present. Thus the presence of plastic deformation or strain in monitoring device 30 as indicated by fringe patterns can indicate to an inspector that structure 50 has experienced a stress in excess of its yield stress and that some action should be taken or the situation investigated further before a catastrophic failure occurs.

The dimensions and base material of monitoring device 30 can also be chosen such that monitoring device 30 permits detection of stress levels in structure 50 below that required to plastically deform structure 50. For example, suppose the objective is to monitor structure 50 to determine if it experiences any stresses in excess of 80% of its yield stress, or 518 MPa (75,200 psi). The dimensions and base material of monitoring device 30 would be chosen by a person skilled in the art such that plastic deformation or failure in detection zone 34 occurs when a strain corresponding to 518 MPa (75,200 psi) in underlying structure 50 is transmitted into monitoring device 30 through its attachment points. If structure 50 experiences a strain in excess of 518 MPa (75,200 psi), monitoring device 30 will plastically deform. This plastic deformation can then be detected during an inspection, even if structure 50 is no longer subjected to the loads that caused the 518 MPa (75,200 psi) stress level. In this case, the stress and strain level being monitored for is within the elastic stress strain range of underlying structure 50. When the load is removed, structure 50 goes back to its original shape. As such, plastic deformation in monitoring device 30 can be used to detect for this level of strain. Plastic deformation in the detection zone of monitoring device 30 would indicate that a stress in excess of 518 MPa had been experienced by structure 50, even if structure 50 is no longer under load.

Similarly, we may want to determine if the stress on structure 50 has exceeded its fatigue limit of 103 MPa (15,000 psi). This is a much lower stress level than the yield point of the structure, and a lower level of strain will be transmitted to monitoring device 30 through its attachment points at this stress level. In order to plastically deform in response to this lower level of strain, monitoring device 30 could be made from a material that deforms plastically at a lower strain. Alternatively the distance between attachment points 36 could be made longer, thereby concentrating a greater amount of strain into detection zone 34. Alternatively, the shape of the monitoring device can be designed such that the stress and strain in the monitoring device is concentrated. Note that multiple monitoring devices could be attached to structure 50 to monitor for different stress levels. For example, if a user would like to determine if a structure has experienced stress and strains in excess of its fatigue limit and stress and strains in excess of 80% of its yield point, two different monitoring devices can be attached to the structure, each one designed to monitor for a different stress strain level. If greater resolution is desired, more monitoring devices can be attached to detect for intermediate values of stress and strain.

Figure 3:
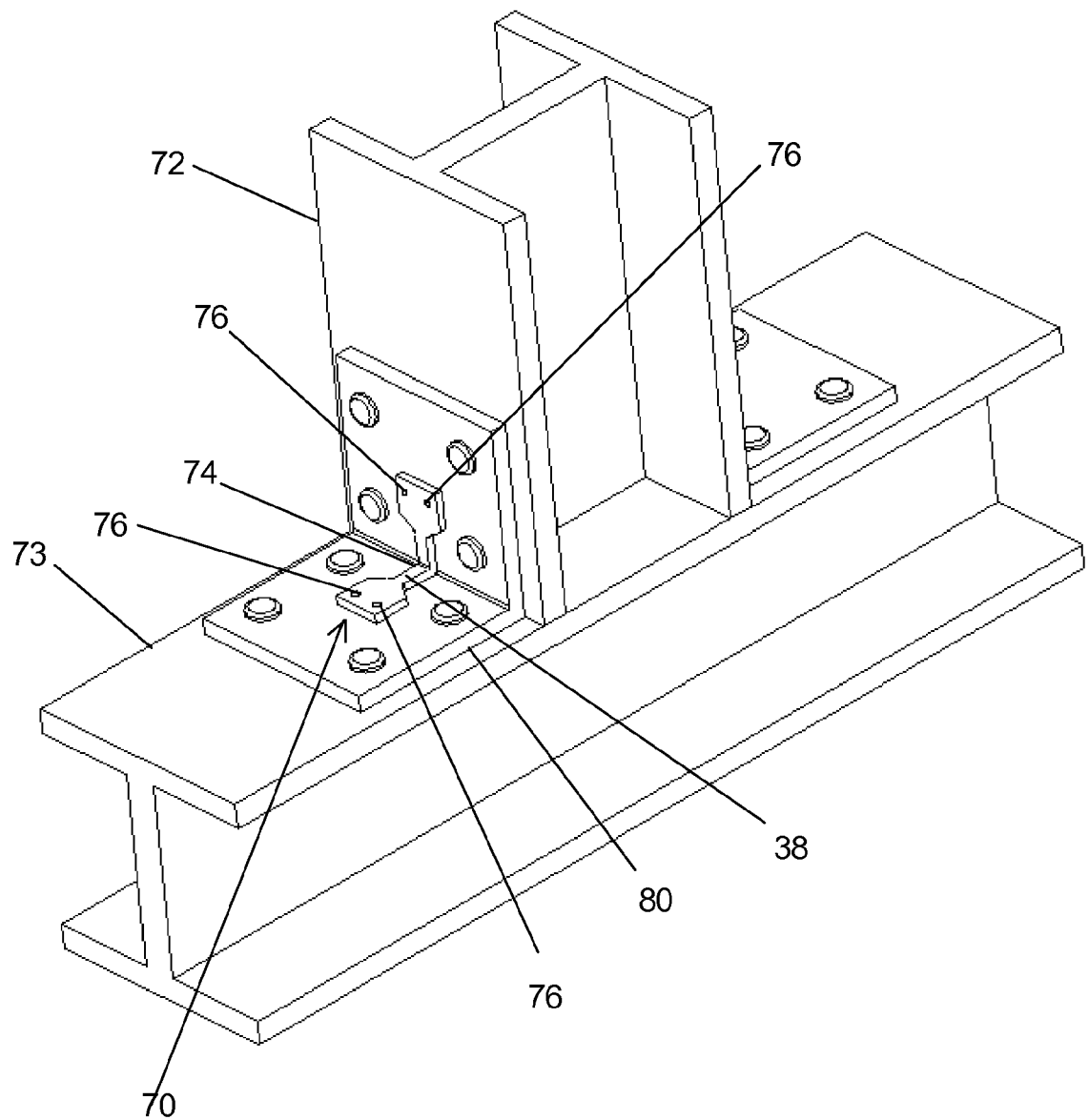
FIG. 3 is a general view of a monitoring device for detecting stress and strain attached to a non-planar structure, according to an embodiment of the present invention.

Description of Non-Planar Example—FIG. 3

FIG. 3 shows an example of a non-planar stress strain monitoring device 70 according to an embodiment of the present invention. Structural element 72 and structural element 73 are joined together at right angles by a bracket 80. In order to monitor stress levels in bracket 80, monitoring device 70 is fabricated with a right angle bend in it and attached to bracket 80 by attachment points 76. The dimensions and base material of monitoring device 70 can be chosen such that a detection zone 74 in monitoring device 70 will plastically deform when bracket 80 experiences a stress strain of a predetermined magnitude. The predetermined stress strain could be within the elastic region of the bracket, or in the non-elastic region of the bracket. If the predetermined stress strain is within the non-elastic region of the bracket, monitoring device 70 itself does not necessarily have to deform plastically to allow for detection of plastic deformation in bracket 80. A photoelastic layer 38 can be applied to the detection zone on monitoring device 70. Structural element 72, structural element 73, and bracket 80 can be subjected to test or service loads. Monitoring device 70 can then be inspected using photoelastic techniques to determine if the loads have caused stresses in bracket 80 in excess of the predetermined level. Fringe patterns in detection zone 74 of monitoring device 70 indicate the presence of strain in monitoring device 70. If bracket 80 is no longer under service or test loads, presence of strain in monitoring device 70 can indicate that bracket 80 has experienced stresses and strains in excess of a predetermined level, if dimensions and material of monitoring device 70 are chosen such that plastic deformation occurs in detection zone 74 when this predetermined level of strain is reached. Alternatively, the dimensions and material of monitoring device 70 can be chosen such that plastic deformation occurs in bracket 80 first, in which case the presence of strain in monitoring device 70 can indicate that stresses and strains have been experienced by bracket 80 sufficient to cause plastic deformation in bracket 80. In this example, a right-angle monitoring device is shown. Monitoring devices can be designed to accommodate a wide variety of non-planar angles and shapes.

Figure 4:
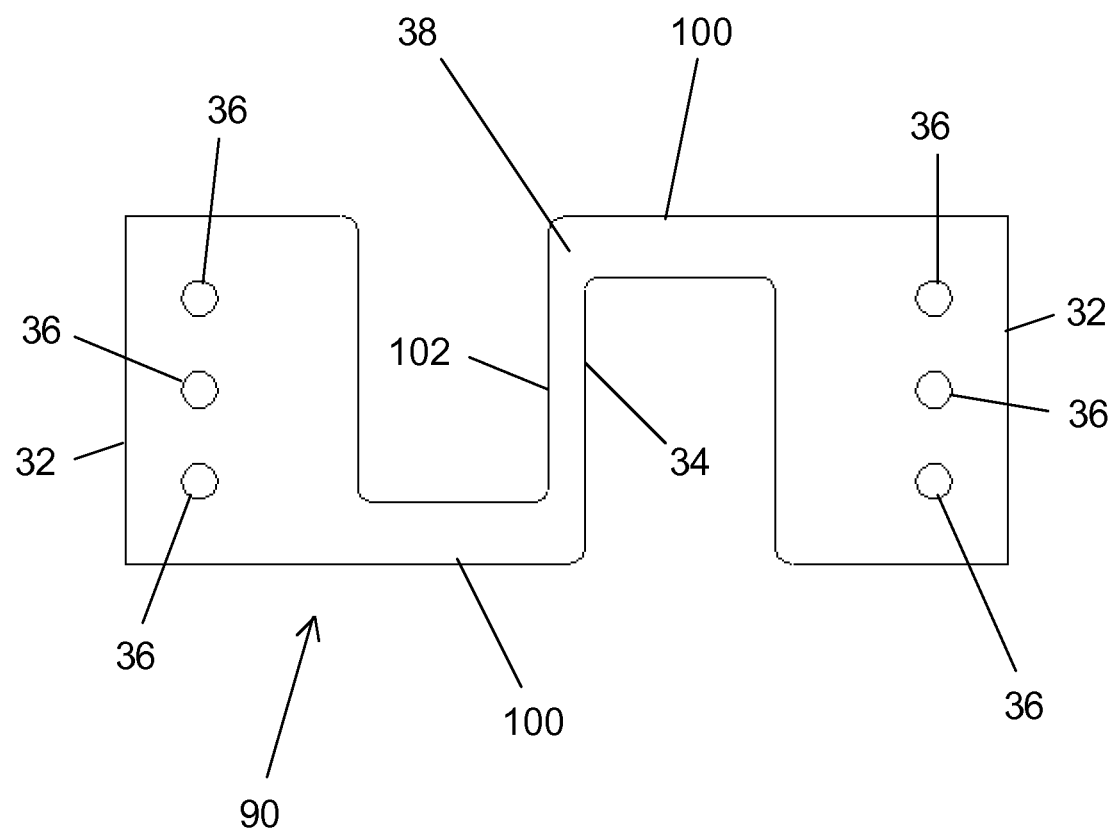
FIG. 4 is a top view of monitoring device for detecting stress and strain, according to an embodiment of the present invention.

Description of Example—FIG. 4

FIG. 4 shows a monitoring device 90, according to an embodiment of the present invention, with two ends 32, attachment points 36, and a detection zone 34 formed from two arms 100 and a beam 102. A photoelastic coating 38 can be attached to the monitoring device using powder coating methods. Monitoring device 90 can be attached to a structure to be monitored using attachment points 36, or by other means. A person skilled in the art can choose materials and dimensions for monitoring device 90 and arms 100 and beam 102 such that plastic deformation or a given stress and strain occurs in a detection zone 34 when a strain of certain magnitude is applied between attachment points 36. The detection zone includes the arms and the beam. The strain at which the monitoring device plastically deforms can be chosen based on the material properties of the underlying structure being monitored and the desired stress level a user would like to detect. Monitoring device 90 is capable of detecting both tensile and compressive stresses, as well as stresses in other directions.

Figure 5:
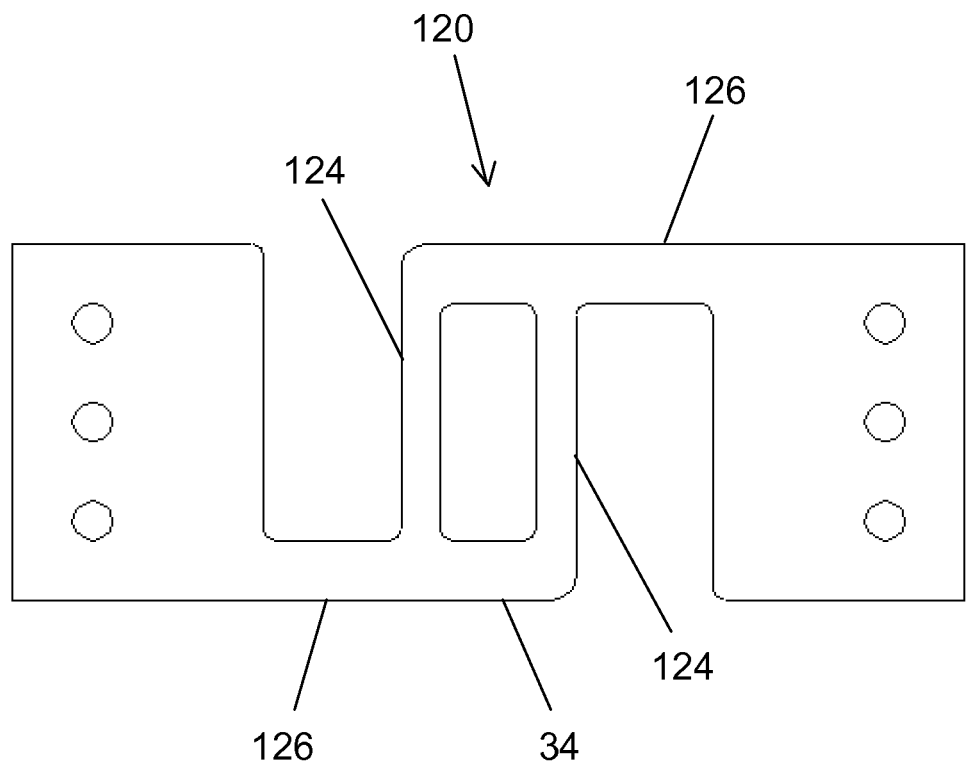
FIG. 5 is a top view of a monitoring device for detecting stress and strain, according to an embodiment the present invention.

Description of Example—FIG. 5

FIG. 5 shows a monitoring device 120, according to an embodiment of the present invention, with a detection zone 34 formed by two arms 126 and two beams 124. Monitoring device 120 can also detect stresses in multiple directions.

Figure 6:
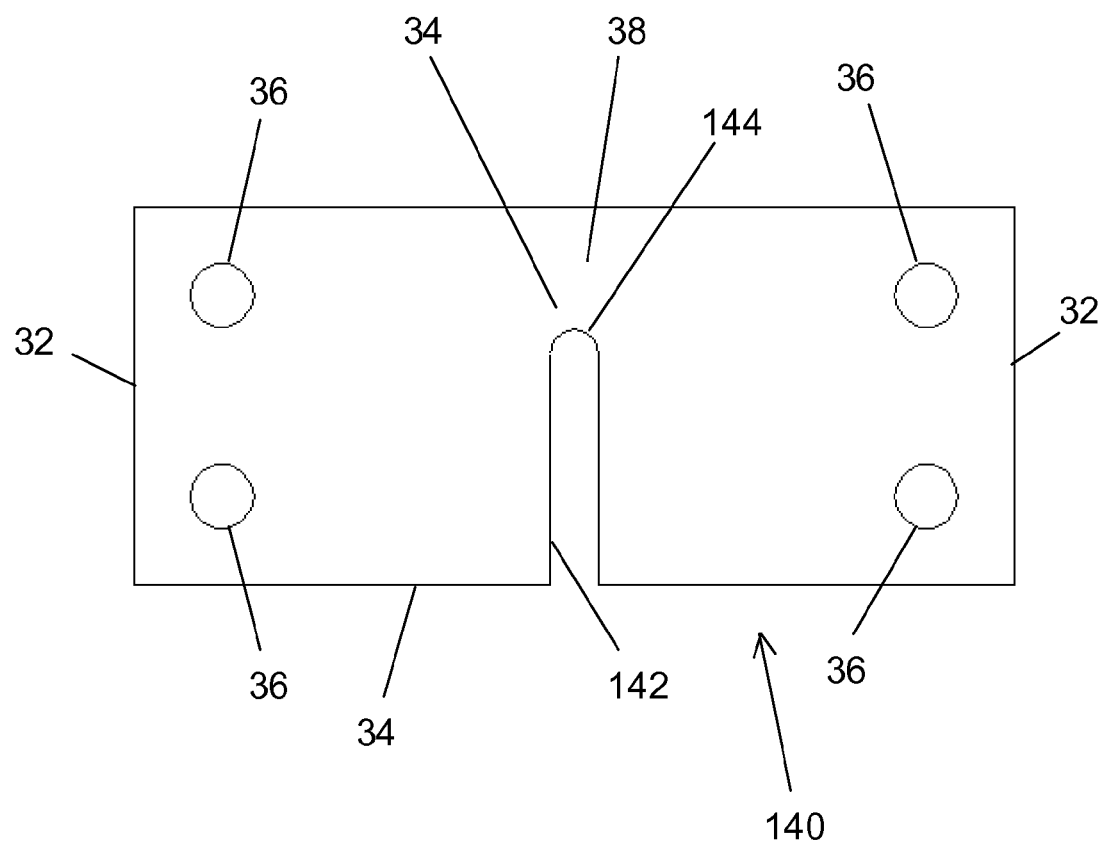
FIG. 6 is a top view of a monitoring device for detecting stress and strain, according to an embodiment of the present invention.

Description of Example—FIG. 6

FIG. 6 shows a monitoring device 140, according to an embodiment of the present invention, that concentrates the strain between attachment points 36 or ends 32 such that a higher level of stress and strain can be generated in the monitoring device in response to a given stress and strain exerted on it by the structure or part being monitored. A detection zone 34 comprises a slot 142 with an end 144. A photoelastic layer 38 can be attached to the monitoring device. The slot 142 tends to concentrate the stress at end 144 according to known formulas. A person skilled in the art can predict the strain required to cause certain strain levels or permanent deformation at the end of slot 142. Using photoelastic techniques to view fringe patterns in photoelastic coating 38, a user can determine if a certain strain level has been reached or if any plastic deformation has occurred. If a certain strain level has been reached or if plastic deformation has occurred in detection zone 34 then it means that the underlying structure has either deformed plastically or experienced a certain predetermined level of stress and strain.

Figure 7:
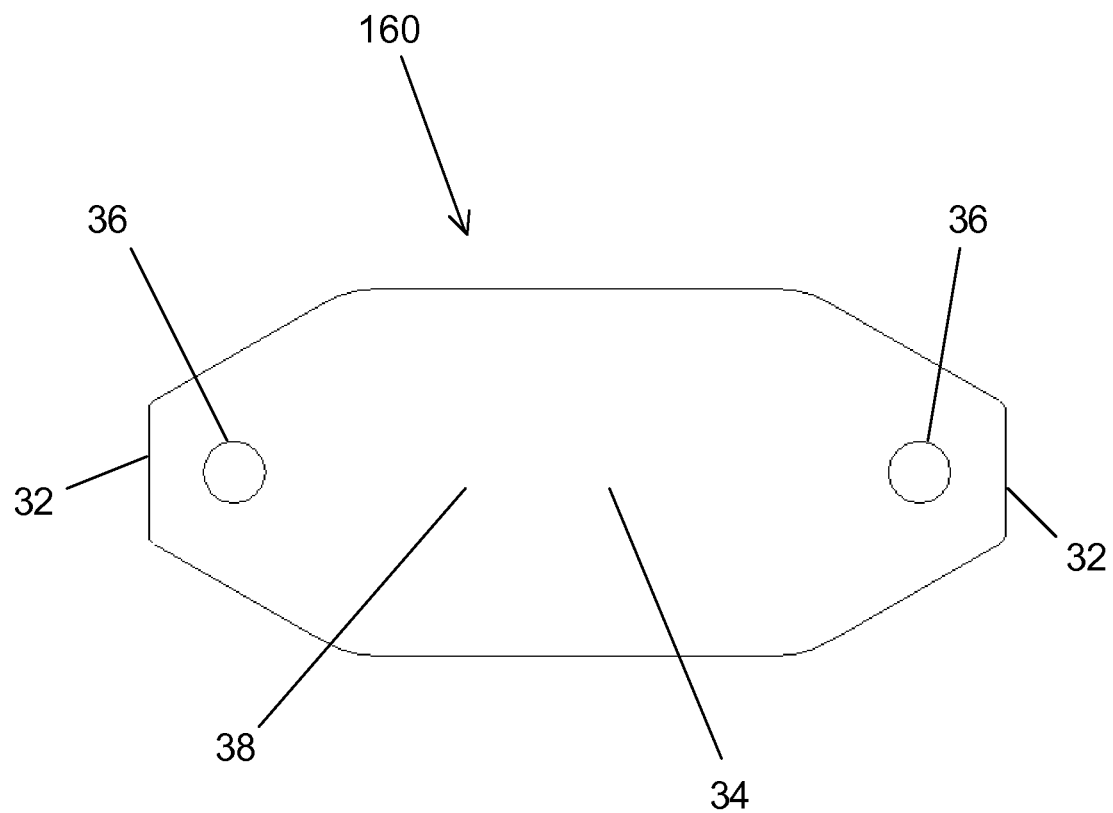
FIG. 7 is a top view of a monitoring device for detecting stress and strain, according to an embodiment of the present invention.

Description of Example—FIG. 7

FIG. 7 shows a monitoring device 160, according to an embodiment of the present invention, with two ends 32, attachment points 36, a detection zone 34, and a photoelastic coating 38. This monitoring device takes strain applied through the attachment points and distributes it evenly over the monitoring device. If monitoring device 160 is made from the same material as the underlying structure it is attached to, the stress and strain in monitoring device 160 can be similar to the stress and strain in the underlying structure. For example, when plastic deformation is observed in monitoring device 160 using photoelastic techniques, the underlying structure is likely also to have experienced stresses sufficient to cause plastic deformation. Two attachment points 36 are shown in FIG. 7. Different numbers of attachment points are possible. Monitoring device 160 can also be attached to an underlying structure not just at its attachment points, but also throughout the whole area of monitoring device 160. In this case, monitoring device 160 experiences the same strains experienced by the underlying structure. As is true with the other examples shown, monitoring device 160 should typically not be made so large or so thick as to reinforce the underlying structure significantly as this could affect the stresses and strains experienced in this area by the structure.

Figure 8:
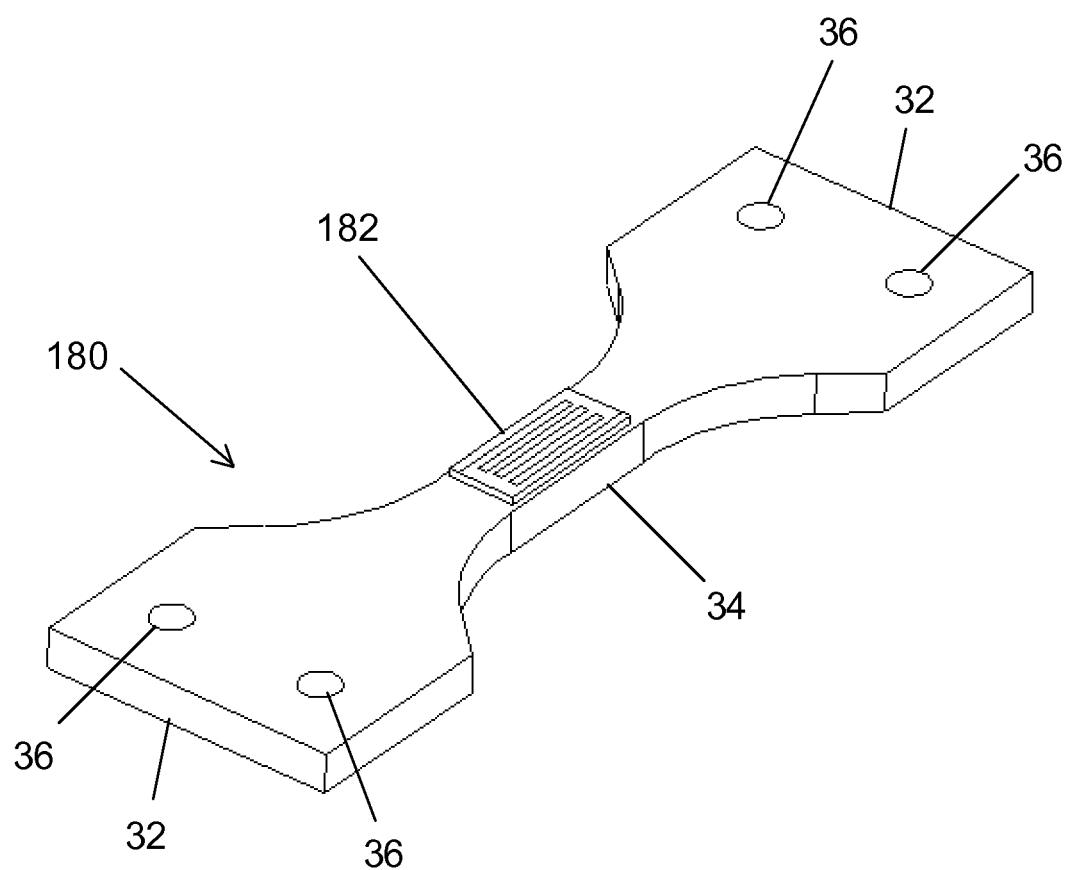
FIG. 8 is a general view of a monitoring device for detecting stress and strain, according to an embodiment of the present invention.

Description of Example of Monitoring Device with Strain Gauge—FIG. 8

FIG. 8 shows a monitoring device 180, according to an embodiment of the present invention, with two ends 32, attachment points 36, and a detection zone 34. As with the other examples according to the present invention, a person skilled in the art can choose dimensions and materials for monitoring device 180 such that it experiences a certain level of strain or deforms at a predetermined stress strain level corresponding to a certain stress and strain level in the underlying structure. However, instead of using a photoelastic layer to detect the permanent deformation, a strain gauge 182 is mounted in detection zone 34. The strain gauge detects strains in the detection zone and can also detect when plastic deformation has occurred. Note that according to the present invention strain gauge 182 does not need to be monitored continuously. Monitoring device 180 can be attached to a structure and left unpowered in the field while the structure is being subjected to service loads. Inspections can be performed by visiting the structure in the field and attaching equipment to the strain gauge to measure the signal from strain gauge 182. If the signal from strain gauge 182 in the absence of strain is known, an inspector can determine if any permanent deformation has occurred by comparing the signal level observed during the inspection with the original one. Alternatively, monitoring equipment can be attached to the strain gauge such that when a certain stress and strain is detected a signal can be sent to a remove location via a cable or wireless means.

Figure 9:
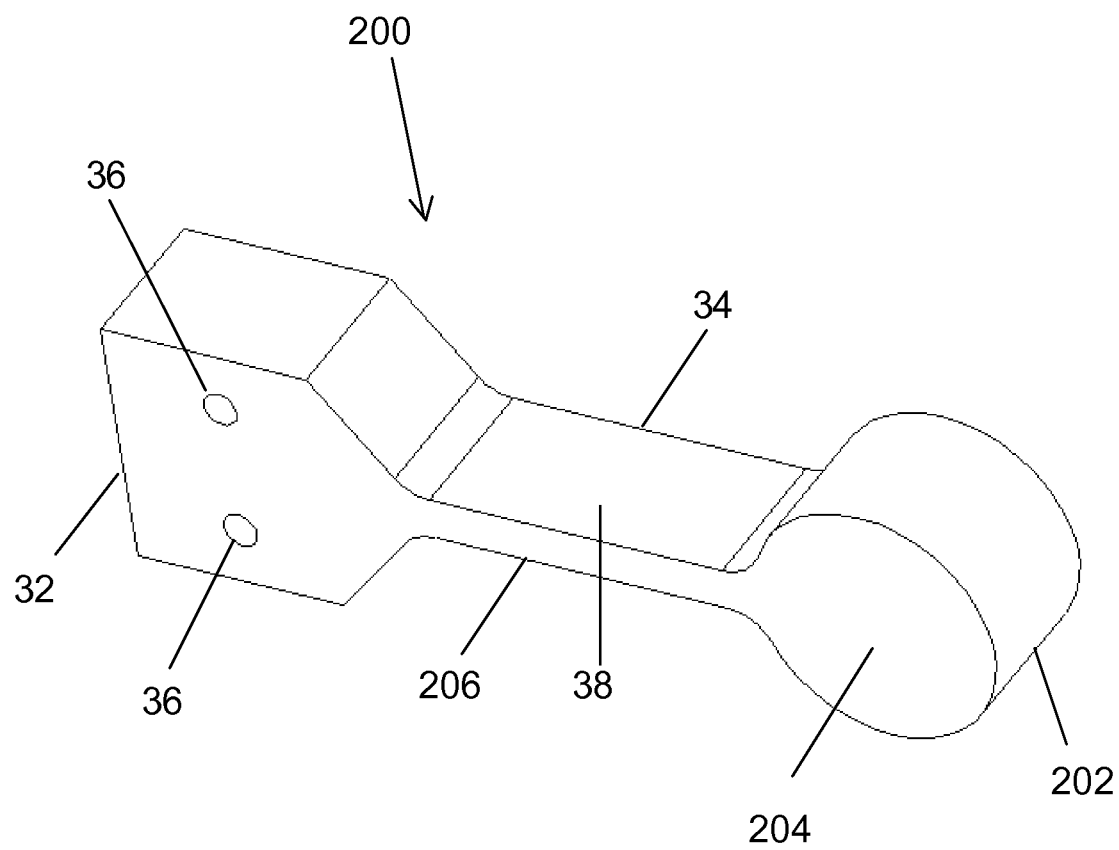
FIG. 9 is a general view of a monitoring device designed to detect vibrations, according to an embodiment of the present invention.

Description of Example for Detecting Vibration—FIG. 9

FIG. 9 shows a monitoring device 200, according to an embodiment of the present invention. Monitoring device 200 comprises an end 32, attachment points 36, a detection zone 34, a photoelastic coating 38, a beam 206, an end 202, and a mass 204. Monitoring device 200 only attaches to the underlying structure at end 32 or via attachment points 36. End 202 is left unattached so it can move freely. A mass 204 is formed into or attached at end 202. When the structure that monitoring device 200 is attached to moves or vibrates, the movement will cause mass 204 at end 202 to move or oscillate. A person skilled in the art can choose mass 204 and the dimensions of monitoring device 200, in particular beam 206, such that plastic deformation occurs in the beam when end 32 experiences a certain force, a certain amplitude of vibration, or a certain frequency of vibration. For example, if we want to detect whether the underlying structure experiences a certain frequency (e.g., resonant frequency that could cause damage in the structure), the dimensions of monitoring device 200 can be chosen such that when end 32 experiences this frequency, monitoring device 200 also experiences resonant frequency that will cause the amplitude of vibrations in the monitoring device to grow larger, leading to plastic deformation in detection zone 34. The dimensions and base material of monitoring device 200 can also be chosen such that plastic deformation occurs when the structure being monitored is subjected to vibrations of a particular amplitude or frequency, or when the structure being monitored is subjected to a shock of a certain magnitude and force.

Monitoring device 200 can be used in structures where vibration needs to be monitored. It can also be used for example in machinery applications, trucks, shipping applications, and others. In shipping applications, monitoring device 200 could be attached to a package and inspected when it reaches its destination to see if the package experienced excessive vibrations during transit. This could for example be a low cost and easy method for shipping companies and shippers to determine who might be at fault if goods are damaged in transit.

Figure 10:
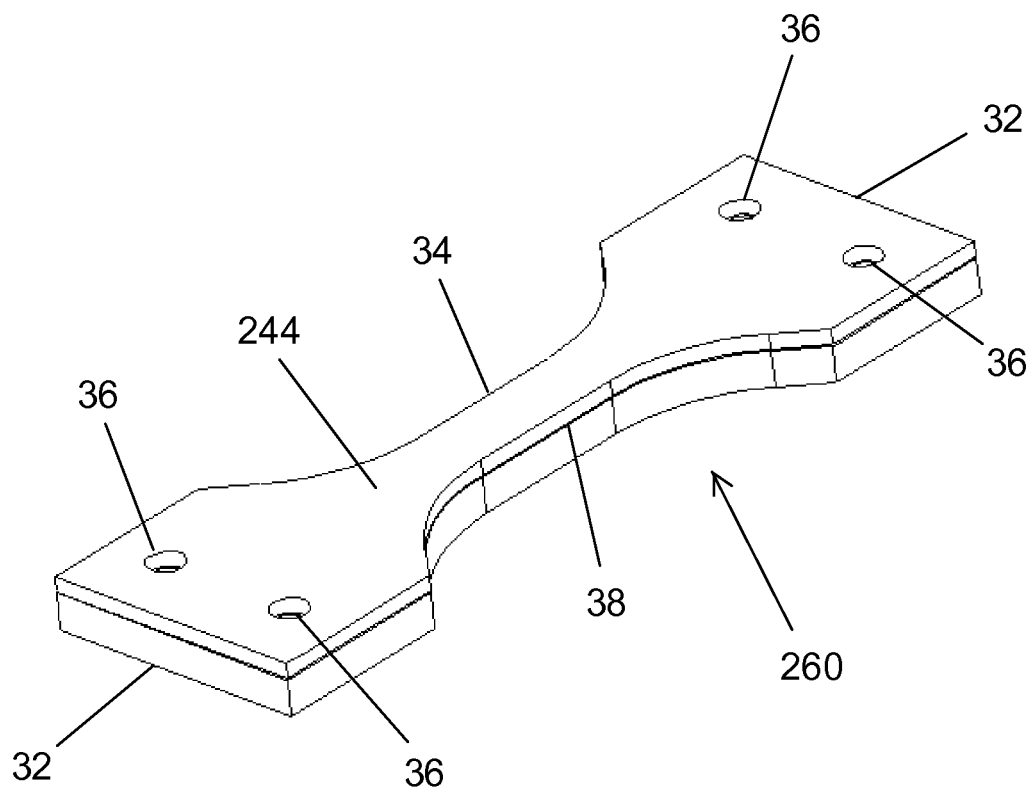
FIG. 10 is a general view of a monitoring device designed for detecting stress and strain with an attached polarizing filter, according to an embodiment of the present invention.

Description of Example Monitoring Device with Attached Polarizing Filter—FIG. 10

FIG. 10 shows a monitoring device 260 for detecting stress and strain levels, according to an embodiment of the present invention, with an integrated polarizer 244. In this example, monitoring device 260 has ends 32, attachment points 36, a photoelastic layer 38, and a detection zone 34. Polarizing filter 244 is attached to photoelastic layer 38. Polarizing filter 244 can cover the entirety of monitoring device 260, or a portion of monitoring device 260. It should cover at least a portion of detection zone 38. Integrated polarizer 244 can be attached to the device by using a variety of methods, including adhesive, rivets, screws, etc. The entire monitoring device including integrated polarizer 244 can be attached to a structure or a part to be monitored using attachment points 36, or by attaching ends 32 to the underlying structure.

Attaching integrated polarizer 244 to photoelastic layer 38 simplifies inspections and reduces the cost of inspections because a polarized light source and specialized instruments with polarizing filters are not required. The need for shielding the area of interest from ambient light such as daylight can be avoided by attaching integrated polarizer 244 in close proximity to photoelastic layer 38. The integrated polarizer should be attached sufficiently close to photoelastic layer 38 so a significant proportion of the light incident on the portion of photoelastic layer 38 that is of interest passes through integrated polarizer 244.

Photoelastic analysis can be carried out by illuminating photoelastic layer 38 through integrated polarizer 244 with a regular light source. Ambient light or light from the sun can also be used to illuminate photoelastic layer 38 through integrated polarizer 244. Incident light from the light source passes through integrated polarizer 244 and photoelastic layer 38, reflects off the reflective layer, and passes through photoelastic layer 38 and integrated polarizer 244 once again. The reflected light can be detected and recorded by a camera or some other instrument, or it can be viewed by an observer to determine if any fringe patterns are evident in photoelastic layer 38. The fringe patterns in photoelastic layer 38 indicate the degree of stress and strain being experienced by monitoring device 260. The number and appearance of the fringe patterns in evidence given a certain stress and strain depends on the material and the thickness of the photoelastic coating. If the underlying structure is no longer under load, the presence of fringe patterns in monitoring device 260 can indicate that plastic deformation has occurred in the underlying structure. This can indicate that the structure has experienced loads that are sufficient to cause the material in the underlying structure to reach and exceed the yield point of the material.

Figure 11:
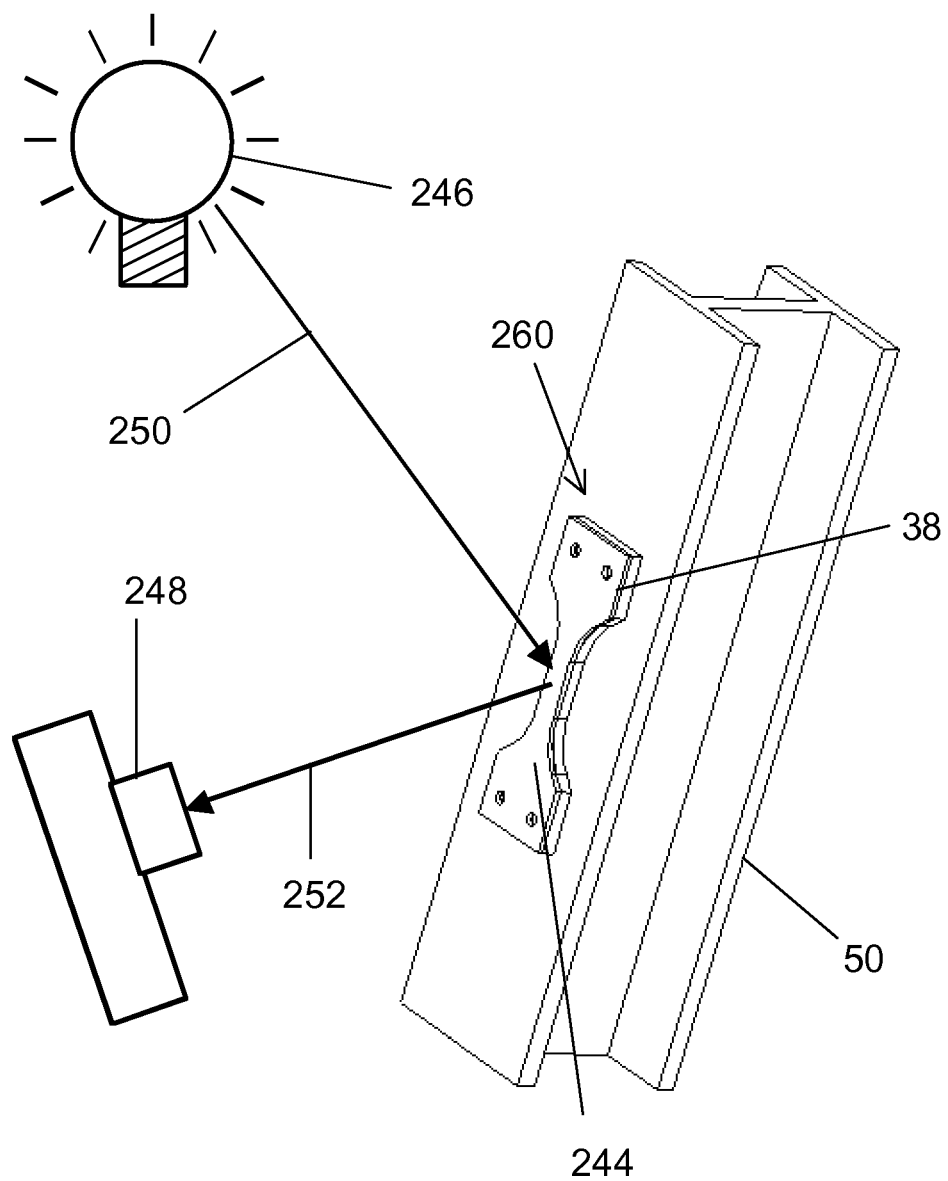
FIG. 11 is a diagrammatic view showing the use of a monitoring device for detecting stress and strain with a polarizing filter attached, according to an embodiment of the present invention.

Description of Example Monitoring Device with Integrated Polarizer—FIG. 11

FIG. 11 shows how monitoring device 260 can be used for structural monitoring according to an embodiment of the present invention. Monitoring device 260 is attached to a structure 50. Structure 50 can be a truss on a bridge, a part of an aircraft landing gear, or any other structure that is subjected to loads that cause stress and strain in the structure. Structure 50 may have been subjected to loads that are no longer present, or it can still be under load. To determine if previous or present loads have caused stresses in excess of a predetermined amount, monitoring device 260 can be illuminated with a source of light 246. Source of light 246 can be an electrical light source, or it can be any other light source such as ambient light or daylight from the sun. Light 250 from the light source passes through integrated polarizer 244 and into photoelastic layer 38. Reflected light 252 passes back through photoelastic layer 38 and back through integrated polarizer 244. Fringe patterns can be seen in reflected light 252 when photoelastic layer 38 is under strain. The fringe patterns can be viewed by an observer, detected by an instrument, or recorded by a camera 248. Inspection using a camera 248 or other detector can help to reveal whether a structure has experienced stresses and strains that are beyond the safe limit for structure 50. If monitoring device 260 shows that excessive stresses and strains have been experienced in structure 50, further action can be taken to remedy the situation or to prevent further possible catastrophic failure of structure 50.

After each inspection has been made, integrated polarizer 244 can remain attached to monitoring device 260 ready for the next inspection to be performed. Because polarizing filter 244 can remain attached to monitoring device 260, inspection is greatly simplified. In order to perform the inspection, monitoring device 260 does not need to be shielded from ambient light (e.g., daylight) so it can be illuminated with polarized light. A regular unfiltered light source 246 can be used. Also, reflected light 252 does not need to be filtered with a second polarizing filter before being viewed. Fringe patterns can be visible to the naked eye or to a detector without any need for additional filtering. Readily available devices such as regular cameras can be used to detect and record the presence or absence of fringe patterns. This can make inspections much simpler and less costly. Another significant benefit of monitoring device 260 is that inspections can be performed at a distance. For example, a truss on a bridge that is not easily accessible due to its height from the ground can be readily inspected using ambient light from the sun for the light source and by using a pair of binoculars or a telephoto lens on camera 248. The data collected using such a method can be easily understand and easily interpreted. The data can also be easily transmitted via electronic or other means for further analysis. All of these factors can help to simplify inspections and reduce inspection costs, thereby increasing safety by allowing more frequent and regular inspections.

Figure 12:
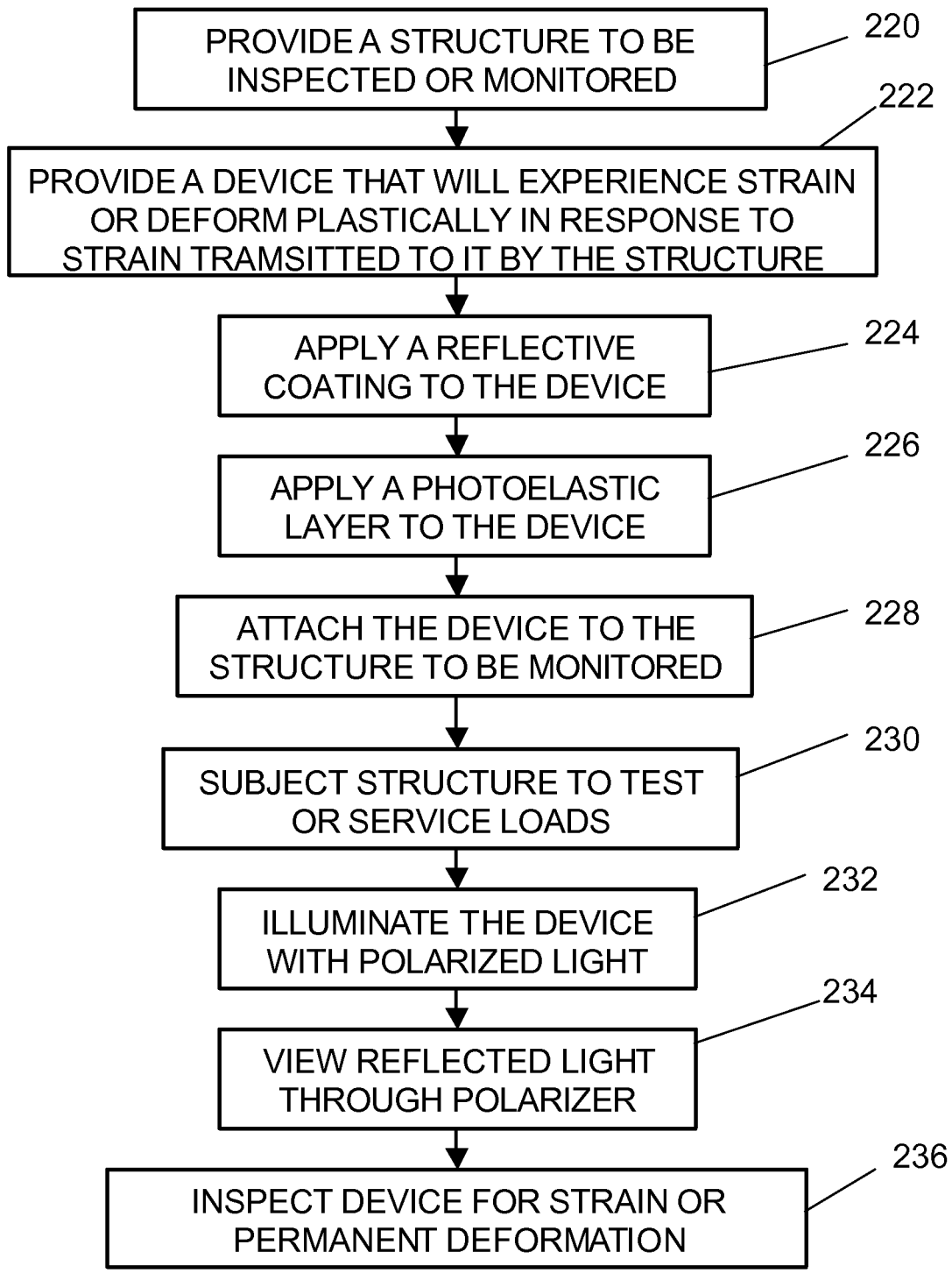
FIG. 12 is a flow chart showing a series of steps for detecting stress and strain, according to an embodiment of the present invention.

Description of Example Method for Structural Monitoring—FIG. 12

FIG. 12 describes an example of a method for monitoring structures such as buildings and bridges, and structural parts such as aircraft landing gear, according to an embodiment of the present invention. In this example, the method comprises a step 220 of providing a structure to be monitored, a step 222 of providing a monitoring device that will experience a certain level of strain or plastic deformation when a certain predetermined stress strain level is transmitted to it by the structure being monitored, and a step 228 attaching the monitoring device to the structure or part to be monitored. The method further comprises a step 236 of inspecting the monitoring device to detect if a certain level of strain or permanent deformation is present. If permanent deformation in the monitoring device has occurred, this is an indication that the underlying structure or part being monitored has experienced stresses and strains in excess of the predetermined amount. Or, alternatively, if strain is detected in the monitoring device during inspection it indicates that the structure is experiencing a load or has plastically deformed. The materials and dimensions of the monitoring device can be chosen such that permanent deformation occurs at a variety of arbitrary levels. For example, the predetermined amount could be chosen such that permanent deformation in the monitoring device occurs when the fatigue limit (typically for steel this would be in a range from 138-276 MPa, or 20,000-40,000 psi) in an underlying structure is exceeded. Or the predetermined stress strain level could be chosen to correspond with the elastic limit of the material in the underlying structure (e.g., for steel this could be in the range 276-2,068 MPa, or 40,000 psi to 300,000 psi). Constant monitoring or data logging is not required. This method of structural monitoring can be significantly simpler, easier, and less costly both in capital costs and inspection costs than existing methods of structural monitoring.

The example shown in FIG. 12 shows an additional step 224 of applying a reflective coating to the monitoring device, and a step 226 of attaching an integrated polarizer to the monitoring device so that the monitoring device can easily be inspected for strain or plastic deformation using photoelastic techniques. The step of applying a reflective coating to the monitoring device could comprise applying a shiny or silvery layer via painting, plating, coating, or by other means. However, the step of applying a reflective layer may not be necessary if the surface of the monitoring device is sufficiently shiny (e.g., if the monitoring device is of made of a metallic material) and can act as the reflective layer. The step of attaching an integrated polarizer to the monitoring device could be accomplished by applying a photoelastic layer using powder coating, applying a photoelastic layer by painting on a wet paint with a solvent that evaporates, or by attaching an integrated polarizer to the monitoring device. Note that step 224 and step 226 may not be necessary if the monitoring device provided in step 222 is made of materials already comprising a photoelastic material.

The example shown in FIG. 12 further comprises a step 232 of illuminating the monitoring device with polarized light, and a step 234 of viewing the reflected light through a polarizing filter. These steps are one possible way to view the monitoring device to detect the presence of fringe patterns in the photoelastic layer or in the monitoring device itself if the monitoring device is made from photoelastic material. In another example, an integrated polarizer can be attached to the monitoring device directly on top of the photoelastic layer, in which case the step of illuminating the monitoring device with polarized light can be replaced with illuminating the monitoring device with regular light, and the step of viewing reflected light through a polarizing filter can be replaced with viewing the reflected light directly through the integrated polarizer. In all these steps, viewing the reflected light can be replaced with detecting and/or recording the reflected light with an instrument such as a camera. The step of determining if any plastic deformation has occurred can comprise a step of reading a signal from a strain gauge if a strain gauge is used to detect strain or permanent deformation instead of a photoelastic layer. Other means of detecting strain or plastic deformation are possible, including simple visual methods to detect if any part of the monitoring device has deformed plastically.

Many modifications, substitutions, and improvements will be apparent to one skilled in the art without departing from the spirit and scope of the present invention as described herein and defined in the claims.

Advantageous Effects of Invention

From the description above, specific embodiments of a monitoring device and a method for using a monitoring device designed to be attached to a structure that can plastically deform or fail at some preset level of stress strain may provide one or more of the following advantages:

Structures such as bridges can be monitored for excessive stress strain levels, possibly resulting from overloading.

Structures and parts can be monitored for plastic deformation using the monitoring device without the need to apply a photoelastic coating or other strain-reading apparatus directly to the structure or part.

The monitoring devices are relatively low cost to make.

Inspections can also be made quickly and at relatively low cost compared to existing NDT methods.

The monitoring device can be powder coated with a photoelastic layer to create a low-cost method of stress strain detection.

No electronics or data loggers are necessarily required to be present on an ongoing basis, greatly reducing the cost of the system and maintenance requirements.

Peak stress events that may be of short duration are less likely to be missed, as is possible with data logging systems with an inherent sampling rate that may miss peak stress events if they occur between sampling times.

The monitoring devices can be used on large structures that are impractical to coat with a photoelastic powder coating.

The monitoring devices can be retrofitted to existing structures.

Minimal training is required to analyze the data from the tests, particularly if the monitoring devices uses a photoelastic stress strain detector. This is because of the optical and visual nature of photoelastic strain detection systems.

Catastrophic failures can potentially be avoided by detecting plastic deformation and early signs of such catastrophic failures before they occur.

We claim:

1. A monitoring device for detecting stress and strain in a structure, said monitoring device comprising a base material, one or more attachment points for attaching said monitoring device to said structure, a detection zone comprising a single layer of photoelastic material for detecting the presence of stress and strain in said detection zone, said single layer of photoelastic material comprising material that is unstressed when said monitoring device does not have stress or strain applied to it through said attachment points; the surface of said detection zone comprising a continuous substantially crack-free surface, and said base material and the dimensions of said monitoring device chosen so that a predetermined level of strain transmitted to said monitoring device by said structure through said attachment points results in a known level of stress and strain in said detection zone.

2. The monitoring device according to claim 1, wherein said detection zone deforms plastically when said predetermined level of strain is transmitted to said monitoring device by said structure through said attachment points.

3. The monitoring device according to claim 1, wherein said detection zone comprises a single layer of photoelastic material applied on top of said detection zone.

4. The monitoring device according to claim 3, wherein said single layer of photoelastic material applied on top of said detection zone comprises a dry powder fused together with heat to form a continuous coating.

5. The monitoring device according to claim 1, wherein said base material comprises a material with photoelastic properties.

6. The monitoring device according to claim 1, wherein said monitoring device is non-planar.

7. A monitoring device for detecting stress and strain in a structure, said monitoring device comprising a base material, one or more attachment points for attaching said monitoring device to said structure, a detection zone, a strain gauge applied to said detection zone for detecting the presence of stress and strain in said detection zone; the surface of said detection zone comprising a continuous substantially crack-free surface, said strain gauge comprising a wire or an optical fiber that changes in length when strain is applied to allow for detection of said strain through measuring a change in electrical resistance through said wire or a change in optical resistance through said optical fiber; said base material and the dimensions of said monitoring device chosen so that a predetermined level of strain transmitted to said monitoring device by said structure through said attachment points results in a known level of stress and strain in said detection zone.

8. A monitoring device for detecting vibration or shock loads in a structure, said monitoring device comprising a base material, a free end, a fixed end with one or more attachment points for attaching said monitoring device to said structure, a detection zone located between said fixed end and said free end, and a means for detecting the presence of stress and strain in said detection zone; the surface of said detection zone comprising a continuous substantially crack-free surface, said base material and the dimensions of said monitoring device chosen so that a predetermined level of vibration transmitted to said monitoring device by said structure through said attachment points results in plastic deformation in said detection zone.

9. The monitoring device according to claim 8, wherein said means for detecting stress and strain in said monitoring device comprises a photoelastic layer applied to said detection zone.

10. The monitoring device according to claim 9, wherein said photoelastic layer comprises a dry powder fused together with heat to form a continuous coating.

11. The monitoring device according to claim 8, wherein said base material comprises a material with photoelastic properties, said material providing said means for detecting stress and strain in said monitoring device.

12. The monitoring device according to claim 8, wherein said monitoring device further comprises a mass formed into or attached to said free end of said monitoring device.

* * * * *